(12) United States Patent
Inoue et al.

(10) Patent No.: US 6,355,355 B1
(45) Date of Patent: Mar. 12, 2002

(54) PACKAGING MATERIALS FOR ELECTROPHOTOGRAPHIC DEVELOPMENT MATERIALS, A PACKAGING METHOD, AND TONER AND DEVELOPER MATERIAL FOR ELECTROPHOTOGRAPHIC DEVELOPMENT

(75) Inventors: Susumu Inoue; Eiichi Kijima; Tatsuo Nakanishi, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/332,296

(22) Filed: Jun. 11, 1999

(30) Foreign Application Priority Data

Jun. 26, 1998 (JP) ............................................. 10-180651

(51) Int. Cl.⁷ ............................................... B32B 15/08
(52) U.S. Cl. ....................... 428/458; 428/212; 428/480; 428/474.4; 428/475.5; 428/500
(58) Field of Search ................................. 428/458, 212, 428/480, 474.4, 475.5, 500

(56) References Cited

U.S. PATENT DOCUMENTS

| 4,009,312 A |   | 2/1977  | Hayashi et al. |           |
|-------------|---|---------|----------------|-----------|
| 4,945,008 A | * | 7/1990  | Heyes et al.   | 428/623   |
| 4,978,572 A |   | 12/1990 | Akao           |           |
| 5,096,755 A |   | 3/1992  | Nakagawa et al.|           |
| 5,180,615 A | * | 1/1993  | Havens         | 428/35.3  |
| 6,017,386 A | * | 1/2000  | Sano et al.    | 106/31.32 |
| 6,066,404 A | * | 5/2000  | Suzuura et al. | 428/516   |

FOREIGN PATENT DOCUMENTS

| CA | 2 237 996    | 6/1997 |
| CA | 2 221426     | 5/1998 |
| EP | 0 192 794 A1 | 9/1986 |
| EP | 0 691 198 A1 | 1/1996 |
| EP | 0 729 076 A1 | 8/1996 |
| EP | 0 845 350 A1 | 6/1998 |
| GB | 2 210 899 A  | 6/1989 |
| WO | WO 97/19811  | 6/1997 |

OTHER PUBLICATIONS

Database WPI, Derwent Publications Ltd., London, GB, AN 90–041984, XP002116897 A of JP 01 320149 A, Dec. 26, 1989.

Derwent Publications Ltd., London, GB, AN 1997–198689, XP002116898 of JP 09 054454 A, Feb. 25, 1997.

Japanese Industrial Standard, JIS Z 0208 (1976), "Testing Methods for Determination of the Water Vapour Transmission Rate of Moisture–Proof Packaging Materials (Dish Method)."

\* cited by examiner

*Primary Examiner*—Bruce H. Hess
*Assistant Examiner*—B. Shewareged

(57) ABSTRACT

A packaging material for electrophotographic development materials is disclosed. The packaging material comprising a film having a moisture permeability of 0.7 g/m²/day, or a packaging material for electrophotographic development materials in which inner-most layer is an adhesive layer, the top layer is a polyester layer, and between them, there are at least an aluminum layer and a polyamide layer. The packaging material exhibits high moisture-resistance and film strength, and can cope with environmental issues.

9 Claims, 1 Drawing Sheet

FILM

Figure 1:
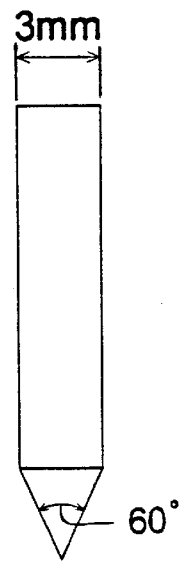
Figure 1:
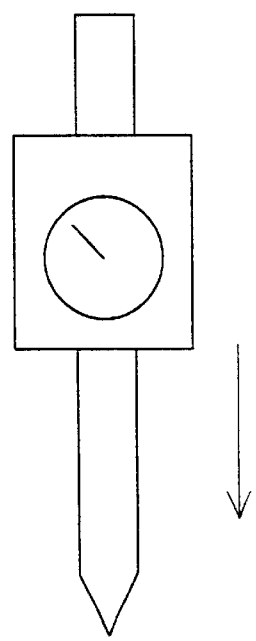
Figure 1:

PACKAGING MATERIALS FOR ELECTROPHOTOGRAPHIC DEVELOPMENT MATERIALS, A PACKAGING METHOD, AND TONER AND DEVELOPER MATERIAL FOR ELECTROPHOTOGRAPHIC DEVELOPMENT

DETAILED DESCRIPTION OF THE INVENTION

The present invention relates to packaging materials to package materials such as electrophotographic toner, developer material, etc., and a packaging method, and an electrophotographic toner and developer material.

FIELD OF THE INVENTION

When packaging an electrophotographic toner and developer material, resins such as Saran film, comprising halogen, have widely been employed. However, such resins have not exhibited sufficient properties for moisture resistance and film strength required for a packaging material for developer material having a substantial weight.

Further, problems may occur in coping with the major environmental issue of much concern recently.

Accordingly, it is assumed that a packaging material, which is comprised of no halogens and exhibits improved moisture resistance, as well as film strength, is increasingly demanded while meeting requirements for high productivity and low cost.

A packaging material such as a container or a packaging film is employed for transportation or storage of the toner or developer for electrophotography. The packaging place or the packaging material are made dirty by scattered toner or other material due to electrification. Certain amount of toner or other material are lost since the scattered toner or other material are abolished. They are also lost in a package since they are not fully supplied to an developing apparatus of the electrophotographic machine because of electrification.

SUMMARY OF THE INVENTION

An object of the present invention is to provide a packaging material which exhibits high moisture resistance and strength as well as adaptability to environmental issues.

The other object is to provide packaging material which makes it possible to reduce the amount of lost toner or developer and to reduce the environmental contamination at by scattered toner when they are supplied to the package or developing apparatus of the electrophotographic machine.

The still other object is to provide a packaging material giving reduced change of characteristics such as charging voltage or flocculation of toner or developer during storage or transportation.

Further, other properties as packaging materials include flexibility, facilitating bag production, no degradation of the external appearance due to formation of wrinkles, no defects which may cause problems during packaging, conveyance, etc. Obviously, packaging materials should exhibit these properties.

The inventors of the present invention have diligently investigated and have accomplished the present invention, while finding that in the packaging materials for electrophotographic toner, developer material, etc., in order to maintain an electrostatic charge, the material is required to have a moisture permeability of no more than 0.7 $(g/m^2)$/day, and those having a moisture permeability of more than this value do not exhibit sufficient performance as a packaging material, and finding a specific means to result in high moisture resistance as well as strength particularly film strength.

The above-mentioned value of moisture permeability is required to maintain, in the initially provided appropriate level, the amount of a specific electrostatic charge. Accordingly, this is a characteristic property for electrophotographic development materials, which are not required of other packaging materials. However, this is an extremely important characteristic for packaging materials for the electrophotographic development materials. However, it has been not clarified yet how important they are, nor has it been known that a packaging material having a moisture permeability of no more than 0.7 $(g/m^2)$/day is desirable.

A material which securely meets this value, is a nonpollutant to the environment, and sufficiently exhibits other performance characteristics as a packaging material, has not been specifically obtained.

The present invention and the embodiments are described below:

1. A packaging material for electrophotographic development material having a moisture permeability of no more than 0.7 $(g/m^2)$/day.
2. The packaging material for electrophotographic development material of item 1 wherein surface resistivity of the packaging material is not more than $10^{12}$ Ω·cm.
3. The packaging material for electrophotographic development material of item 2 wherein the packaging material is a film composed of plural layers.
4. The packaging material for electrophotographic development material of item 1 wherein the packaging material is a film comprising an aluminum layer having a polyamide layer on one side of the aluminum layer and a polyester layer on the other side of the aluminum layer.
5. The packaging material for electrophotographic development material of item 4 wherein the packaging material further comprises an adhesion layer provided on the polyamide layer.
6. The packaging material for electrophotographic development material of item 4 wherein thickness of the aluminum layer, the polyamide layer and the polyester layer are 3 to 20 μm, 5 to 50 μm and 3 to 40 μm, respectively.
7. An electrophotographic development material packaged with a packaging material having a moisture permeability of no more than 0.7 $(g/m^2)$/day.
8. An electrophotographic development material of item 7 wherein surface resistivity of the packaging material is not more than $10^{12}$ Ω·cm.
9. An electrophotographic development material of item 8 wherein the packaging material is a film comprising a metal layer having a polyamide layer on one side of the metal layer and a polyester layer on the other side of the metal layer.
10. An electrophotographic development material of item 8 wherein the electrophotographic development material comprises a toner whose binder resin is composed of styrene/acryl resin or polyester resin.
11. An electrophotographic development material of item 9 wherein polyester of the polyester layer is polyethylene naphthalate, polyethylene terephthalate or polybutylene terephthalate.

12. An electrophotographic development material of item 9 wherein polyamide of the polyamide layer is nylon.

13. An electrophotographic development material of item 9 wherein the metal layer is an aluminum layer and thickness of the metal layer, the polyamide layer and the polyester layer are 3 to 20 µm, 5 to 50 µm and 3 to 40 µm, respectively.

14. A package comprising an electrophotographic development material packaged with a packaging material which has a moisture permeability of no more than 0.7 (g/m$^2$)/day, and is composed of a metal layer having, on one side of the metal layer, a polyamide layer having tensile strength of 4 to 20 kg/mm$^2$ and a polyester layer having tensile strength of 10 to 30 kg/mm$^2$ on the other side of the metal layer.

15. A package of item 14 wherein the packaging material further comprises an adhesion layer having tensile strength of 0.5 to 25 kg/mm$^2$ provided on the polyamide layer.

The layers of the packaging material are preferably arranged in such a manner that the inner-most layer is an adhesive layer, the uppermost layer is a polyester layer, and between these layers, there are at least an aluminum layer and a polyamide layer.

The layers may be also arranged in such a manner that the inner-most layer is an adhesive layer, the uppermost layer is a polyester layer, and between these layers, there are at least an aluminum layer and a polyamide layer, and the moisture permeability is no more than 0.7 g/m$^2$/day.

The thickness of the aluminum layer is preferably 3 to 20 µm, which is composed of an aluminum foil or evaporated layer. The thickness of the polyester layer is preferably 3 to 40 µm.

The thickness of the polyamide layer is preferably 5 to 50 µm.

The entire layer thickness is preferably 30 to 200 µm. The inner-most layer is preferably an adhesive layer, and from the uppermost layer, layers are laminated in the order of a polyester layer, an aluminum layer, and an polyamide layer.

A bag is prepared employing a packaging material so that the inside has a adhesive layer and the opening of the bag is thermally press-sealed.

The electrophotographic development material may be packaged by such steps that a bag is prepared by employing a continuous film-shaped packaging material described above, electrophotographic development material is placed into the bag, the opening is thermally press-sealed, and bags are successively cut and separated.

BRIEF DESCRIPTION ON DRAWING

FIG. 1 is a view of a puncture resistance measurement method.

DETAILED DESCRIPTION OF THE INVENTION

The moisture permeability as described in the present invention is a value measured by the Cup method and specifically, a value measured by a method specified in JIS Z 0208 (1976).

The packaging material preferably has moisture permeability of not more than 0.5, more preferably not more than 0.3 (g/m$^2$)/day.

Electrification quantity of the developer is variable. Charge of the developer increases by frictional electrification with the surface of the packaging material, or decreases extremely by resistance of the surface of the packaging material contacting with the developer. Further, when the surface of the packaging material contacting with the developer is charged, it sometimes causes toner scattering. The surface contacting to the developer of the invention is preferably set not more than $10^{12}$ Ω·cm, more preferably not more than $10^{11}$ Ω·cm, particularly $10^8$ to $5 \times 10^{10}$ Ω·cm.

The structure of the packaging material of the present invention is as described above. The function of each incorporated layer is briefly described below.

In order to obtain a film-shaped packaging material having a low moisture permeability, it is preferable to employ metallic foil such as aluminum foil, preventing from arising potential pinhole thicker.

In case that the aluminum layer or other metal layer is excessively thick, its stiffness is excessive, which may result in the generation of wrinkles when preparing bags, and may cause frequent transporting problems due to degraded transporting properties of the film. As described above, disadvantages also result in cost as well as weight. The optimal thickness of the aluminum layer is between 3 and 20 µm. The aluminum layer or other metal layer is formed by laminating aluminum foil or by aluminum evaporation.

Tensile strength of polyamide layer is 4 to 20 kg/mm$^2$, preferably 6.3 to 12.7 kg/mm$^2$ according to test by ASTM D882-61T. Component in polyamide layer is a polymer having amide bond within primary chain, and preferable example is nylon, including nylon, nylon 11, nylon 12, nylon 6, nylon 66, nylon 610, nylon 612, nylon MXD, and particularly nylon 6 is preferable. The polyamide is preferably biaxially stretched in view of strength, oxygen permeability and shape preservability.

The optimal thickness of the polyamide layer is between 5 and 50 µm, and is required for securing the enhancement of the layer strength such as tear strength, etc. Furthermore, a polyester layer plays a role to secure heat resistance of the uppermost surface brought into direct contact with a heated plate when being thermally sealed as a packaging material, and at the same time, to secure lubricating properties when it is placed in a bag-making apparatus. In view of this, the polyester layer preferably is stable in its characteristics against heat up to more than 100° C., more preferably 120° C. It is preferable to have heat resistance up to 250° C. or preferably up to 200° C. for the purpose of convenience of production process. The optimal thickness of the polyester layer is between 3 and 40 µm.

Tensile strength of polyester layer is 10 to 30 kg/mm$^2$, preferably 14 to 25 kg/mm$^2$ according to test by ASTM D882-61T. Component in polyester layer is a polymer having ester bond within primary chain, and preferable example includes polyethylene terephthalate, polyethylene naphthalate and polybutylene terephthalate in view of high heat resistance and easy handling.

The polyamide layer or polyester layer may comprises a compound other than polyamide or polyester respectively or may composed of plural polyamide resins or polyester resins as far as not giving adverse affect. Further, other component may be copolymerised with the polyamide or polyester as far as not giving adverse affect. Each of layer may be composed of a single layer or plural layers.

Further, an adhesive layer employing thermal sealing, is commonly provided on the most inner surface of the packaging material which contacts with the developing material when packaged. Further, thickness of the adhesive layer is selected so that the developer can be sealed adequately. For example, supposing average particle size of the developer being D, the thickness is required not less than ⅔×D, preferably not less than ½×D. In case that the developers includes carrier, D is that of carrier. The thickness of the adhesive layer is preferably 19 to 190 $\mu$m. Tensile strength of adhesive layer is 0.5 to 25 kg/mm$^2$, preferably 1.1 to 5.0 kg/mm$^2$ according to test by ASTM D882-61T. Preferable example of the component of the adhesive layer includes polyethylene (particularly low density polyethylene or linear low density polyethylene), polypropylene (particularly non stretched one), ethylene/vinyl acetate copolymer, iomer (particularly copolymer of ethylene/methacrylic acid crosslinked by metal ion). Among these polyethylene is particularly preferable. For this, a polyethylene layer is frequently employed, which exhibits excellent sealing strength, foreign matter compatibility, hot-tacking properties, smoothness, as well as being low in cost. Component of the polyethylene layer is polyethylene, preferably low density polyethylene having density of not more than 0.93. The polyethylene layer may comprises a compound other than polyethylene or the resin employed in the layer may be copolymerised with a monomer other than ethylene. The adhesive layer may be composed of a single layer or plural layers. The preferable example is laminate composition of a layer containing low density polyethylene and a layer containing linear low density polyethylene. Polyethylene layer may contain other component as far as not giving adverse affect.

Accordingly, for the complete layer composition, it is preferred that the uppermost layer is the polyester layer, followed by the aluminum layer, and the polyamide layer, in this order, and as the inner-most layer, the heat sealing adhesive layer, such as polyethylene.

The total layer thickness is optimally between 20 and 200 $\mu$m. An excessively thick layer is not preferred for a film packaging material because wrinkles form during manufacture of the bags due to excessive stiffness, and film transporting properties are degraded. In addition, disadvantages result in cost as well as weight.

The packaging material can be produced by any method of, for example, heat extrusion method, T-die method, injection molding method or immersion coating method.

The electrophotographic development materials as described in the present invention are those employed for electrophotographic development, being specifically a toner or a developer material. In this case, the developer material, of course, includes a single component developer material and a double component developer material.

Materials composing toner particles commonly are binder resins and colorants. As binder resins, styrene-acrylic resins or polyester resins are most commonly employed. Colorants include carbon black, magnetic materials, etc. for monochromatic use and various types of dyes and pigments for color use. Further, various performance-improving agents such as releasing agents, charge-controlling agents, etc. may be incorporated into the toner particles.

The particle diameter of these toner particles is preferably between 4 and 20 $\mu$m in terms of volume average particle diameter, and is more preferably between 6 and 10 $\mu$m.

Further, fine silica particles, etc. as an external additive are commonly added to these toner particles.

Further, in the double component developer material, magnetic material particles with a volume average particle diameter of 24 to 120 $\mu$m are commonly incorporated as a carrier. Employed as the magnetic material particles are iron powder, ferrite, magnetite, etc., and a coating carrier is preferred in which these particles are covered by a resin.

Furthermore, regarding the mixing ratio of the toner to the carrier in the double component developer material, a toner ratio of 3 to 25 weight percent is usually employed.

EXAMPLES

The present invention will be detailed with reference to examples. However, the present invention is not limited to these.

Example 1

From the top, a 12 $\mu$m polyester layer composed of polyethylene terephthalate, a 9 $\mu$m aluminum layer, and a 25 $\mu$m polyamide layer composed of biaxially stretched nylon 6 were successively provided in this order. In the inner-most layer, a polyethylene adhesive layer composed of low density polyethylene was provided and thus a film-shaped packaging material was prepared.

Examples 2 Through 5 and Comparative Examples 1 Through 3

Each packaging material was prepared in the same manner as Example 1, except that some of the conditions were varied as described in Table 1.

Bags were prepared employing the resulting materials and were inspected for the properties as described below:

Moisture Permeability

Moisture permeability was measured by the Cup method, as described above.

Bag Preparing Properties

Evaluation was carried out as described below, based on visual appearance.

A: no problem noted

B: when carefully observed, slight wrinkles were noted

C: wrinkles were clearly evident

Puncture Resistance

A 3 mm rod tapered to 60° point as shown in FIG. 1 was placed on a film sample and the weight necessary to break through the film was expressed in number of grams.

A: more than 150 g

B: 100 to 150 g

C: less than 100 g

Charge Amount Holding Ratio

After packaging a double component developer material, the resulting package was stored at high temperature and humidity (30° C. and RH 80%) for 20 days. Thereafter, the ratio of the resulting charge amount to the initial charge was determined.

AA: 80% or more

A: 60% or more but less than 80%

B: 40% or more but less than 60%

C: less than 40%

TABLE 1

| | Polyester Layer (μm) | Aluminum Layer (μm) | Polyamide Layer (μm) | Total Film Thickness (μm) | Moisture Permeability (g/m2/day) | Charge Amount Holding Ratio | Bag Preparing Properties | Puncture Resistance |
|---|---|---|---|---|---|---|---|---|
| Example 1 | 12 | 9 | 25 | 96 | 0 | AA | A | A |
| Example 2 | 15 | 12 | 15 | 115 | 0 | AA | A | A |
| Example 3 | 38 | 5 | 30 | 152 | 0 | AA | A | A |
| Example 4 | 4 | 18 | 5 | 67 | 0 | AA | A | A |
| Example 5 | 20 | (E) 7 | 15 | 100 | 0.25 | AA | A | A |
| Comparative Example 1 | 15 | 0 | 15 | 100 | 3.95 | C | A | A |
| Comparative Example 2 | 0 | 0 | 30 | 100 | 4.63 | C | A | C |
| Comparative Example 3 | 20 | 0 | 0 | 90 | 3.90 | C | A | B |
| Comparative Example 4 | 120 | 0 | 0 | 230 | 3 | C | C | A |

"E" indicates that the layer is prepared by evaporation.
Others were prepared by aluminum foil lamination.

As can be clearly seen in the results of Table 1, all properties of Examples 1 through 5, in the scope of the present invention are commercially viable. On the contrary, at least one of the properties of Comparative Examples 1 through 4 out of the scope of the present invention is not in the commercially viable range. Accordingly, Comparative Examples exhibit problems of commercial viability.

According to the present invention, it is possible to provide a packaging material without halogen which exhibits high moisture-resistance and film strength, and can cope with environmental issues.

What is claimed is:

1. An electrophotographic development material comprising a toner packaged with a packaging material having a moisture permeability of not more than 0.7 (g/m$^2$)/day wherein
   the toner has a binder comprising styrene/acryl resin or polyester resin, and
   the packaging material is a film comprising a metal layer having a polyamide layer on one side of the metal layer and a polyester layer on the other side of the metal layer and has an inner-most layer contacting the toner, the inner-most layer comprising a polyethylene, polypropylene or ethylene/vinyl acetate copolymer or iomer and having a surface resistivity measured on the surface contacting the toner of not more than $10^{12}$ Ω·cm.

2. An electrophotographic development material comprising a toner packaged with a packaging material having a moisture permeability of not more than 0.7 (g/m$^2$)/day wherein
   the toner has a binder comprising styrene/acryl resin or polyester resin, and
   the packaging material is a film comprising a metal layer having a polyamide layer on one side of the metal layer and a polyester layer on the other side of the metal layer; the packing material further has an inner-most layer contacting the toner, the inner-most layer being provided on the polyamide layer, and a surface resistivity measured on the surface contacting the toner of not more than $10^{12}$ Ω·cm.

3. An electrophotographic development material having a shape of a bag having an opening which is thermally press-sealed and comprising a toner packaged with a packaging material having a moisture permeability of not more than 0.7 (g/m$^2$)/day wherein the toner has a binder comprising styrene/acryl resin or polyester resin, and the packaging material has surface resistivity of not more than $10^{12}$ Ω·cm.

4. An electrophotographic development material comprising a toner packaged with a packaging material having a moisture permeability of not more than 0.7 (g/m$^2$)/day wherein the toner has a binder comprising styrene/acryl resin or polyester resin, and
   the packaging material is a film comprising a metal layer having a polyamide layer on one side of the metal layer and a polyester layer on the other side of the metal layer, said polyamide layer has tensile strength of 4 to 20 kg/mm$^2$ and said polyester layer has tensile strength of 10 to 30 kg mm$^2$, the packing material further has an inner-most layer contacting the toner, the inner-most layer comprising a polyethylene, polypropylene or ethylene/vinyl acetate copolymer or iomer, and a surface resistivity measured on a surface contacting the toner of not more than $10^{12}$ Ω·cm.

5. The electrophotographic development material of claim 4, wherein the inner-most layer is provided on the polyamide layer.

6. The electrophotographic development material of claim 5, wherein the polyester of the polyester layer is polyethylene naphthalate, polyethylene terephthalate or polybutylene terephthalate, and the polyamide of the polyamide layer is nylon.

7. The electrophotographic development material of claim 6, wherein the metal layer is aluminum layer, and the thickness of the metal layer and the polyamide layer and the polyester layer are 3 to 20 μm, 5 to 50 μm and 3 to 40 μm. respectively.

8. The electrophotographic development material of claim 7, wherein the inner-most layer comprises polyethylene.

9. The electrophotographic development material of claim 8, having a shape of a bag having an opening which is thermally press-sealed.

* * * * *